United States Patent [19]

Miyatsuka et al.

[11] 4,407,901

[45] Oct. 4, 1983

[54] MAGNETIC RECORDING MEDIUM

[75] Inventors: Hajime Miyatsuka; Akira Kasuga; Yasuyuki Yamada, all of Odawara, Japan

[73] Assignee: Fuji Photo Film Co., Ltd., Kanagawa, Japan

[21] Appl. No.: 300,823

[22] Filed: Sep. 10, 1981

[30] Foreign Application Priority Data

Sep. 12, 1980 [JP] Japan .................................. 55/126815

[51] Int. Cl.$^3$ ........................... G11B 5/70; B32B 5/16
[52] U.S. Cl. .................................. 428/694; 252/62.54; 360/134; 360/135; 360/136; 427/127; 427/128; 428/695; 428/900; 428/407
[58] Field of Search ............... 428/900, 694, 695, 407; 252/62.54; 427/127, 128; 360/134–136

[56]  References Cited
U.S. PATENT DOCUMENTS

| 4,092,256 | 5/1978 | Goodson et al. | 252/62.54 |
| 4,115,296 | 9/1978 | Kubota et al. | 252/62.54 |
| 4,197,347 | 4/1980 | Ogawa et al. | 427/128 |
| 4,234,438 | 11/1980 | Horigome et al. | 252/62.54 |
| 4,305,993 | 12/1981 | Zaitsu et al. | 427/128 |
| 4,332,863 | 6/1982 | Hosaka | 427/128 |
| 4,334,887 | 6/1982 | Frank et al. | 427/128 |

FOREIGN PATENT DOCUMENTS

| 2502657 | 1/1976 | Fed. Rep. of Germany | 427/128 |
| 55-73930 | 6/1980 | Japan | 427/128 |
| 55-84036 | 6/1980 | Japan | 427/128 |

*Primary Examiner*—Ellis P. Robinson
*Attorney, Agent, or Firm*—Sughrue, Mion, Zinn, Macpeak and Seas

[57]  ABSTRACT

A magnetic recording medium is disclosed comprising a non-magnetic base bearing a magnetic layer mainly consisting of ferromagnetic particles and a binder wherein the magnetic layer contains a polymer having a polar functional group and a degree of polymerization of not more than 100.

10 Claims, No Drawings

MAGNETIC RECORDING MEDIUM

FIELD OF THE INVENTION

This invention relates to a magnetic recording medium, and more particularly, to a magnetic recording medium using ferromagnetic particles.

BACKGROUND OF THE INVENTION

A magnetic recording medium basically consists of a non-magnetic base made of polyethylene terephthalate film, polycarbonate film or polyimide film, and an overlying magnetic layer principally made of ferromagnetic particles and a binder. Fine particles of oxide-based compounds have been conventionally used as the ferromagnetic particles. Today, ferromagnetic metal particles having high saturation magnetization and coercive force are used for the purpose of providing increased magnetic recording density and reproduction output. Although metallic magnetic materials have desired magnetic characteristics, they have low chemical stability and are easily oxidized and attacked by corrosion. As a result, a magnetic recording medium using these materials does not perform consistently over an extended period of time. The metallic magnetic particles also have high saturation magnetization ($\sigma s$). Furthermore, due to strong interaction between the individual particles, a dispersion of the particles cannot be easily formed and once formed the dispersion does not remain stable for a sufficient period of time. As a further disadvantage, the metallic magnetic particles are highly inflammable in air and present handling problems during transport and manufacturing. It is well known that the smaller the grains of a magnetic recording medium, the higher the recording density. But then, the problems described above become conspicuous.

To eliminate these defects, several methods have been proposed and some of them are currently used on a commercial basis. They include:

(a) Formation of a modified layer such as oxide, sulfide or nitride on the surface of magnetic particles (Japanese Patent Publication No. 3862/60, Japanese Patent Application (OPI) Nos. 54948/77, 85054/77, 149458/76, 112465/76 (the symbol OPI as used herein means an unexamined published Japanese application), U.S. Pat. Nos. 4,113,528, 3,700,499, 3,904,448, 3,960,569, Japanese Patent Application (OPI) Nos. 123601/74 and 5038/78);

(b) Formation of an aliphatic acid, aliphatic acid salt, complex, coupling agent, surfactant or polymer on the surface of magnetic particles by means of adsorption or chemical bonding (Japanese Patent Publication No. 20116/68, Japanese Patent Application (OPI) Nos. 97738/74, 135835/74, 8798/78, 109498/76, 72498/77, 119696/79, 77270/79, 12958/72 and U.S. Pat. 4,063,000);

(c) Polymerization on the surface of magnetic particles or direct deposition of a polymer on their surface (U.S. Pat. No. 3,480,553, Japanese Patent Application (OPI) Nos. 102606/76, 78099/78 and 39662/80); and (d) Formation of a metal coating on the surface of magnetic particles by electroless plating or replacement plating (Japanese Patent Application (OPI) Nos. 60800/75, 67250/76, U.S. Pat. Nos. 3,892,600, 3,856,581, 3,856,580, 3,853,640, 3,892,599, 3,856,582 and 3,892,601.

However, none of the conventional methods are sufficiently effective to solve the problems with the metallic magnetic particles. In method (a), if the thickness of the modified layer is increased to achieve greater effect, the magnetic characteristics of the particles are reduced. Therefore, it is difficult to have a good balance between the thickness of the modified layer and the magnetic characteristics of the particles. In method (b), strong adsorption is difficult to obtain, and if a highly reactive substance is selected, it may react with the constitutent metal atom of the magnetic powder when it is blended with a binder and as a result, the reaction product may dissolve out in the dispersion. In method (c), a thick polymer coating has a tendency to reduce the magnetic characteristics of the particles or to agglomerate the particles when they are subjected to a subsequent treatment. The metal coating formed by the method (d) often has a corrosive effect on the surface of the metallic magnetic particles thereby greatly reducing their characteristics.

SUMMARY OF THE INVENTION

Therefore, one object of this invention is to provide a magnetic recording medium having good magnetic characteristics.

Another object of this invention is to provide a magnetic recording medium having good stability.

Still another object of this invention is to provide a magnetic recording medium having good video characteristics.

A further object of this invention is to provide a ferromagnetic powder having good dispersibility.

A still further object of this invention is to provide a ferromagnetic powder which is not highly inflammable in air.

These objects can be achieved by including a polymer with a polar functional group and a degree of polymerization of not more than 100 in a magnetic layer formed on a non-magnetic base. A particularly good result is obtained by treating the surface of the ferromagnetic particles in the magnetic layer with a polymer having a polar functional group and a degree of polymerization of not more than 100 before they are dispersed in a binder.

DETAILED DESCRIPTION OF THE INVENTION

The ferromagnetic particles used in this invention are the particles of magnetic oxides such as gamma-$Fe_2O_3$, $Fe_3O_4$ and $CrO_2$, magnetic metal particles such as Fe, Co and Ni or magnetic alloy particles, or mixtures thereof. Since this invention is particularly effective when the magnetic layer is made of metallic magnetic particles, the following description assumes the use of metallic magnetic particles, but it should be understood that this invention is appliable to oxide-based magnetic particles with similar results.

The term "ferromagnetic metal particles" as used herein means fine metal or alloy particles having ferromagnetism. They contain at least about 75 wt%, preferably at least 80 wt%, of metals, with the balance being hydrogen or oxygen in the form of water, hydroxide or oxide in an amount of not more than about 25 wt%, preferably not more than 20 wt%, particularly preferably from 1 to 15 wt%. At least about 80 wt%, preferably from 85 to 100 wt%, of the metals consists of a ferromagnetic metal which must contain at least iron. Namely, the ferromagnetic metal is a metal (Fe) or alloy (i.e., Fe-Co, Fe-Ni or Fe-Co-Ni). The ferromagnetic metal contains at least about 50 wt%, preferably from 70 to 100 wt%, of iron, and less than about 50 wt%, preferably from 0 to 30 wt%, of the balance is Co, Ni or Co-Ni. The metal content of the ferromagnetic metal powder may contain a non-magnetic metal (less than about 10 wt%, preferably from 0.05 to 5 wt%) and/or a non-metallic element (about 0.1 to 10 wt%, preferably from 0.1 to 5 wt%). Illustrative non-magnetic metals and non-metallic elements include B, C, N, Al, Si, P, S, Ti, Cr, Mn, Cu, Zn, Mo, Pd, Ag, Sn, Sb, Ba, La, Ce, Sm, W, and Pb. These non-magnetic metals and non-metallic elements may be used individually or in combination.

The following methods are known to produce ferromagnetic metal powders, and they can be used to produce the ferromagnetic metal powder of this invention:

(1) an organic acid salt of a ferromagnetic metal is decomposed with heat and reduced with a reducing gas;

(2) an acicular oxyhydroxide or an acicular oxyhydroxide containing a dissimilar metal or an acicular iron oxide derived from these oxyhydroxide is reduced by, for example, a reducing gas such as hydrogen gas;

(3) a ferromagnetic metal is evaporated in a low-pressure inert gas such as argon gas, helium gas;

(4) a metal carbonyl compound is decomposed with heat;

(5) a ferromagnetic metal powder is electro-deposited on a mercury cathode and then separated from the mercury; and (6) a slat of metal capable of forming a ferromagnetic material is dissolved in water and reduced with a reducing substance (e.g. hydrogenated boron compound, hypophosphite or hydrazine) to form a ferromagnetic powder. Of these methods, methods (2), (3) and (6) are preferred in this invention, and method (2) is particularly preferred.

The resulting fine metal particles are commonly stabilized by oxidizing their surface. For the purposes of this invention, it is particularly effective that the particles contain at least 5% of oxygen as determined by atomic-absorption spectroscopy and other suitable methods for composition analysis.

When the individual grains of the ferromagnetic metal powder of this invention are in the form of a chain, their minor axis is less than 500 Å, preferably from 150 to 400 Å, and the ratio of major to minor axis (i.e. the ratio of the length of the grains linked in a necklace form to the minor axis) is at least 3, preferably from 5 to 20. When the grains are acicular, they are 0.3 to $2\mu$ long and have an acicular ratio of 5/1 to 10/1. They have a saturation magnetization ($\sigma s$) of from about 100 to 190 emu/g (as measured for Hm=10 KOe) and a coercive force (Hc) of at least about 800 Oe, preferably from 900 to 2500 Oe. The ferromagnetic metal powder of this invention can be blended with a binder to form a magnetic paint.

A polymer having a relatively low molecular weight is introduced into the magnetic layer according to this invention. The degree of polymerization Pn (number average degree of polymerization) is not more than 100, preferably not more than 70, particularly preferably not more than 50. It is important that the polymer have in the molecule a polar functional group having great affinity for the magnetic particles. Examples of such functional group are carboxyl group, hydroxyl group, phenolic-OH group and sulfonic acid group. These functional groups are desirably contained in an amount of 1 to 30 mol%. Illustrative polymers include those wherein the backbone consists of acrylic acid ester or methacrylic acid ester and the functional moiety consists of acrylic acid, methacrylic acid, crotonic acid or 2-hydroxymethyl acrylate. An example of such polymers is an acrylic copolymer. Other examples of the polymer that can be introduced into the magnetic layer are a copolymer of vinyl chloride or vinyl acetate and maleic anhydride or vinyl alcohol, a copolymer of styrene and a polymerizable unsaturated monomer having the polar functional groups defined above, polyvinyl phenol, polyvinyl alcohol, polyvinyl acetal, polystyrene sulfonic acid, and a copolymer of vinylidene chloride and a polymerizable unsaturated monomer having the polar functional groups defined above.

The polymer can be introduced into the magnetic layer generally by two methods: (1) it is added while a dispersion of the magnetic particles in a binder is prepared; or (2) it is adsorbed or deposited on the surface of the magnetic particles before it is dispersed in a binder. Method (2) is preferred to method (1) since it produces a greater effect using a smaller amount of polymer. The following description is directed to method (2). The method can be performed in several manners, and for achieving uniform adsorption or deposition on surface of the grains, it is desired that they be treated with a solution of the polymer; for example, the particles are immersed in a polymer solution and dried subsequently, or the particles are passed through a mist of the polymer solution, or a mixture of the polymer solution and the particles is dried as it is stirred. If too much polymer is used, the mechanical strength of the magnetic layer is reduced. If the polymer is not adequately miscible with the binder, the surface and electromagnetic conversion characteristics of the magnetic layer are deteriorated. In consideration of these points, the polymer is used in an amount of from 0.1 to 10 wt%, desirably from 0.3 to 7 wt%, particularly desirably from 0.5 to 5 wt%, of the magnetic particles.

The binder to be used in this invention is a conventional thermoplastic resin, thermosetting resin, reactive resin or a mixture of these resins. Suitable thermoplastic resins have a softening point of less than 150° C., an average molecular weight of about 10,000 to 200,000, and a degree of polymerization of about 100 to 1000. Examples of such polymers are vinyl chloride/vinyl acetate copolymer, vinyl chloride/vinylidene chloride copolymer, vinyl chloride/acrylonitrile copolymer, acrylic acid ester/acrylonitrile copolymer, acrylic acid ester/vinylidene chloride copolymer, acrylic acid ester/styrene copolymer, methacrylic acid ester/acrylonitrile copolymer, methacrylic acid ester/vinylidene chloride copolymer, methacrylic acid ester/styrene copolymer, urethane elastomer, polyvinyl fluoride, vinylidene chloride/acrylonitrile copolymer, butadiene/acrylonitrile copolymer, polyamide resin, polyvinyl butyral, cellulose derivative (e.g. cellulose acetate butyrate, cellulose diacetate, cellulose triacetate, cellulose propionate, or nitrocellulose), styrene/butadiene copolymer, polyester resin, various synthetic thermoplastic rubbers (e.g. polybutadiene, polychloroprene, polyisoprene, styrenebutadiene copolymer) and mixtures thereof.

The thermosetting or reactive resin is such that it has a molecular weight of less than 200,000 when it is in coating solution and that upon being heating after coating and drying, its molecular weight is increased infinitely due to condensation, addition or other reactions. Preferred thermoplastic or reactive resins are those which do not soften or melt until they are decomposed with heat. Specific examples are phenol-formaldehyde novolak resin, phenol-formaldehyde resol resin, phenol-furfural resin, xyleneformaldehydr resin, urea resin, melamine resin, drying oil-modified alkyd resin, phenolic resin-modified alkyd resin, maleic acid resin-modified alkyd resin, unsaturated polyester resin, epoxy resin/curing agent (e.g. polyamine, acid anhydride, or polyamide), isocyanate-terminated polyester moisture hardening resin, isocyanate-terminated polyether moisture hardening resin, polyisocyanate prepolymer (compound having three or more isocyanate groups in one molecule as obtained by reacting diisocyanate with a low molecular triol, diisocyanate trimer or tetramer), resin having polyisocyanate prepolymer and active hydrogen (e.g. polyester polyol, polyether polyol, acrylic acid copolymer, maleic acid copolymer, 2-hydroxyethyl methacrylate copolymer, parahydroxystyrene copolymer), and mixtures thereof.

The magnetic paint also contains a lubricant and an abrasive, and it may optionally contain a dispersant, antistat and a corrosion inhibitor. The magnetic paint thus prepared is applied onto a nonmagnetic base to form the magnetic recording medium of this invention. The magnetic paint used to produce the magnetic recording medium of this invention can be prepared by any of the known methods described in, for example, Japanese Patent Publications Nos. 11162/73, 21331/73 and 33683/73, U.S. Pat. Nos. 3,240,621, 3,526,598, 3,728,262, 3,790,407 and 3,836,393. The ferromagnetic particles are mixed with the binder at a weight ratio of 8–25 (binder) to 100 (ferromagnetic particles). The resulting magnetic layer has a thickness of 0.5 to 6μ on a dry basis. Illustrative lubricants are silicone oils such as polysiloxanes; inorganic particles such as graphite, tungsten disulfide and molybdenum disulfide; fine plastic particles such as polyethylene and polytetrafluoroethylene; long-chain aliphatic acids, aliphatic acid ester; and fluorocarbons. These lubricants are added in an amount of from 0.2 to 20 parts by weight per 100 parts of binder. Illustrative abrasives are the fine particles of fused alumina, silicon carbide, chromium oxide $Cr_2O_3$), corundum and diamond whose average size is in the range of from 0.05 to 5μ. These abrasives are added in an amount of from 0.5 to 20 parts by weight per 100 parts by weight of binder.

The ferromagnetic particles, binder, lubricant, abrasive and other additives are dissolved in an organic solvent to form a uniform composition. Examples of the organic solvent are ketones such as methyl ethyl ketone and cyclohexanone; alcohols; esters such as ethyl acetate and butyl acetate; aromatic solvents such as benzene, toluene and xylene; and chlorinated hydrocarbon solvents such as carbon tetrachloride and chloroform. The coating composition thus prepared is then applied to a nonmagnetic base. Examples of the nonmagnetic base are synthetic resins (e.g. polyester, vinyl polymer, cellulose derivative), nonmagnetic metals and paper. The base is used in the form of a film, tape, sheet or other suitable forms. The magnetic layer formed on the base is subjected to orientation and drying steps, and is optionally passed through a smoothing step for improving the S/N ratio or other magnetic properties (e.g. smoothing before drying or calendering after drying).

The polymer used in this invention is clearly distinguishable from the binder resin. The binder one of the purposes of which is to give mechanical strength to the magnetic layer desirably has a fairly large number average degree of polymerization (Pn) which is usually greater than 100, preferably greater than several hundreds. If the polymer used in this invention has a Pn of 100 or more, it may be used as the binder for magnetic layer but with such polymer, the desired effects of this invention are not achieved. In particular, the polymer has no effect on reducing the viscosity, and when the magnetic particles are given a surface treatment, they tend to agglomerate into a large mass that is difficult to disperse in the binder. In addition, such polymer is not as effective in stabilizing the magnetic metal particles as the polymer of low molecular weight that is used in this invention. The polymer contemplated by this invention preferably has a molecular structure the same as that of the binder resin. Dissimilar molecular structures often have low miscibility and eventually decrease the surface properties of the magnetic layer.

This invention offers the following advantages:

1. The magnetic properties of the ferromagnetic metal particles remain stable longer than those of the conventional product, so there is no reduction in saturation magnetization or decrease in the magnetic tape characteristics with time;

2. The ferromagnetic metal particles are less flammable and present no danger during handling;

3. The ferromagnetic metal particles have sufficient dispersibility to provide a tape having high S/N ratio;

4. A coating dispersion of the ferromagnetic metal particles is hard to gel and remains very stable throughout the process of making a magnetic recording medium since the magnetic particles form a highly stable dispersion; and 5. The coating dispersion has decreased viscosity and improved filtrability and hence is easy to handle during the subsequent process.

While details of the mechanism by which these advantages of this invention are achieved are not clearly known, our experiments show that presumably, an important factor is to provide ferromagnetic metal particles with a uniform coating of a polymer having a relatively low molecular weight and a polar functional group with high affinity for the particles. As the molecular weight of the polymer is increased, the advantages described above are gradually lost, and in particular, the time-related stability of the magnetic characteristics of the particles, their dispersibility and viscosity of the dispersion are greatly reduced.

A better result is obtained by using ferromagnetic metal particles having an oxidized surface. A similar result is obtained by using an oxide-based magnetic material. A similar result is also achieved by adding the polymer of this invention in a coating dispersion of ferromagnetic particles in a binder rather than coating the ferromagnetic particles with the polymer before they are dispersed in the binder. This method is particularly effective for improving the dispersibility of the ferromagnetic particles and providing a dispersion of low viscosity. This is perhaps because the polymer of low molecular weight having a polar functional group is preferentially adsorbed onto the surface of the ferromagnetic particles.

As described above, the advantages of this invention are achieved primarily by the fact that a low-molecular polymer unsuitable for use as binder is provided on the surface of ferromagnetic particles. The conventional technique of surface treatment with polymer, for example, the methods described in Japanese Patent Applications (OPI) Nos. 12958/72 and 83406/79, rely on the use of a high-molecular polymer for binder and do not achieve as great effect as that obtained by this invention.

This invention is now described in greater detail by reference to the following examples and comparative examples which are given here for illustrative purposes only and are by no means intended to limit the scope of the invention. In the examples and comparative examples, all parts are by weight.

EXAMPLE 1

Acicular particles of alpha-FeOOH containing 5 wt% cobalt were decomposed with heat in an oven to produce alpha-$Fe_2O_3$ particles which were reduced with hydrogen to form black, ferromagnetic particles. Before recovering the particles from the oven, they were subjected to gradual oxidation by increasing gradually the partial oxygen pressure in the oven. The resulting particles had the following magnetic characteristics: coercive force (Hc)=1100 (Oe), saturation magnetization ($\sigma$s)=125 (emu/g), squareness ratio ($\sigma$r/$\sigma$s)=0.44.

Five hundred parts of the ferromagnetic particles was immersed in 1500 parts of a 1 wt% solution of a butyl acrylate-acrylic acid copolymer (molar ratio=80:20, number average degree of polymerization (Pn)=ca. 30) in methyl ethyl ketone. The solution was left to stand at about 25° C. for 24 hours, and the particles were recovered from the solution by centrifugation and dried at about 25° C. Seven parts of the polymer was left on the surface of the ferromagnetic particles.

Three hundred parts of the resulting particles and a composition having the following formulation were placed in a ball mill where they were mixed thoroughly for 10 hours.

| | |
|---|---|
| Polyester polyurethane (reaction product of ethylene adipate and 2,4-tolylene diisocyanate, ave. m.w. based on styrene: ca. 130,000) | 30 parts |
| Vinyl chloride-vinyl acetate-maleic anhydride copolymer (wt. ratio = 83:16:1) | 35 parts |
| Dimethyl polysiloxane (degree of polymerization: ca. 60) | 2 parts |
| n-Butyl acetate | 300 parts |
| Methyl isobutyl ketone | 300 parts |

To the mixture, there was added 22 parts of a triisocyanate compound [Desmodule L-75 Bayer A. G., 75 wt% ethyl acetate solution of an adduct of 3 mols of tolyene diisocyanate and 1 mol of trimethylolpropane (m.w.=ca. 760, NCO content=13.3 wt%)], and the resulting mixture was stirred by a high-speed shear disperser for one hour to provide a magnetic paint.

The magnetic paint was applied to one surface of a polyethylene terephthalate film (25 μm thick, surface roughness: less than 2 μm) in a dry thickness of 5 μm, and placed in a D.C. magnetic field (2500 Oe) for 0.02 seconds for orientation, and then dried at 100° C. for 2 minutes. A wide web was obtained. After measuring its gloss, the web was supercalendered through a metal roll (chrome-plated steel roll; backup roll) and a nylon roll (calender roll). The nip pressure, calendering temperature and speed were 50 kg/cm², 60° C. and 30/min, respectively. The web was then slit into a ½ inch video metal tape.

COMPARATIVE EXAMPLE 1

A video metal tape was produced by repeating the procedure of Example 1 except that the ferromagnetic metal particles were not treated with a butyl acrylate-acrylic acid copolymer.

The time-dependent change in the magnetic properties of the polymer-treated particles of Example 1 and the particles of Comparative Example 1 were measured by a vibrating flux meter (Model VSM-III of Toei Kogyo K.K). The results are shown in Table 1.

TABLE 1

| | <Magnetic properties of ferromagnetic particles> | | | | | |
|---|---|---|---|---|---|---|
| | Initial values | | | Values after aging* | | |
| | Hc (Oe) | $\sigma$s (emu/gr) | $\sigma$r/$\sigma$s | Hc | $\sigma$s | $\sigma$r/$\sigma$s |
| Example 1 | 1100 | 120 | 0.46 | 1100 | 112 | 0.45 |
| Comparative Example 1 | 1100 | 125 | 0.44 | 1100 | 98 | 0.44 |

(*Left at 40° C., R.H. 80% for one week)

Table 1 shows that the magnetic particles of Example 1 prepared according to this invention underwent a smaller time-dependent change in magnetic properties than the particles of Comparative Example 1.

An ignition test on a hot plate in air showed that the magnetic particles of Example 1 which caught fire at about 110° C. were less inflammable than those of Comparative Example 1 which caught fire at about 100° C.

The tapes prepared in Example 1 and Comparative Example 1 were examined for their gloss before calendering, magnetic properties and video sensitivity. The video sensitivity was a reproduction output as measured at 5 MHz by a VHS video tape recorder (Model NV-8800 of Matsushita Electric Industrial Co., Ltd.) that was retrofitted with a record/reproduce head made of "Sendust", a special alloy. As a reference tape, Fuji Video Cassette T-120E of Fuji Photo Film Co., Ltd. was used. The results are shown in Table 2.

TABLE 2

| | Viscosity of dispersion (poise) | <Magnetic properties of tape> | | | | | Video sensitivity at 5 MHz (dB) |
|---|---|---|---|---|---|---|---|
| | | Magnetic properties | | | | Gloss(**) | |
| | | Hc (Oe) | Bm | Br/Bm | Bm'(*) | | |
| Example 1 | 64 | 1050 | 3200 | 0.77 | 3100 | 30 | +9.0 |
| Comparative Example 1 | 86 | 1050 | 3200 | 0.75 | 2800 | 25 | +8.0 |

(*)Values after aging at 40° C. and R.H. 80%
(**)Gloss of each sample before supercalendering as indicated by percentage of light reflected at 45°.

As table 2 shows, the tape using the magnetic particles of Example 1 had high gloss and good squareness ratio (Br/Bm), which indicated the increased dispersability of the magnetic particles. In addition, the dispersion was easy to handle because its viscosity was low enough to obviate the need of using more solvent.

COMPARATIVE EXAMPLE 2

A video magnetic tape was prepared by repeating the procedure of Example 1 except that the polymer solution was replaced by an equal amount of methyl ethyl ketone. The magnetic characteristics of the magnetic particles and the tape were almost the same as those obtained in Comparative Example 1.

EXAMPLE 2

A magnetic tape was prepared by treating the surface of magnetic particles under the same conditions as in Example 1 except that the acrylic copolymer was replaced by polyvinyl phenol (OH equivalent=ca. 120) having a degree of polymerization (Pn) of about 40..As in Example 1, the magnetic particles had increased stability with time, were less inflammable, and the tape had improved characteristics.

EXAMPLE 3

A magnetic tape was prepared by treating the surface of magnetic particles under the same conditions as in Example 1 except that the butyl acrylate-acrylic acid copolymer was replaced by a lauryl methacrylate-acrylic acid copolymer molar ratio=85:15, Pn=ca. 25). The performance of the magnetic particles and the tape were as good as in Example 1.

EXAMPLE 4

A magnetic tape was produced by repeating the procedure of Example 1 except that 10 parts of the acrylic copolymer was blended with a dispersion of magnetic particles in binder instead of the use of the acrylic copolymer as the surface treating agent. The viscosity of the dispersion was reduced although the degree of reduction was a little bit less than achieved in Example 1. The characteristics of the magnetic tape were also improved.

EXAMPLE 5

A magnetic tape is produced by treating the surface of ferromagnetic magnetic particles under the same conditions as in Example 1 except that the magnetic particles were those of gamma-$Fe_2O_3$. The improvement achieved in the characteristics of the dispersion and magnetic tape was equal to that obtained in Example 1.

EXAMPLE 6

An ingot of iron and cobalt (70:30) in the form of a solid solution was placed in an evaporating oven which was evacuated to about $10^{-5}$ Torr and then filled with argon to 1 Torr. While the pressure of argon was held at 1 Torr, the ingot was evaporated by high-frequency induction heating and the vapor was condensed in the resulting magnetic field to form fine black ferromagnetic metal particles. The evaporating oven was fed with dry air over a period of about 10 hours to replace the argon. Ferromagnetic metal particles thus obtained had a metal content of 87 wt%.

A tape was prepared by treating the surface of the ferromagnetic metal particles under the same conditions as in Example 1. It had the same characteristics as those of the tape prepared in Example 1.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic base; and
   a magnetic layer on said base consisting mainly of ferromagnetic metal particles and a binder, said ferromagnetic particles are surface-treated with a polymer having a polar functional group and a degree of polymerization of not more than 100 and then dispersed in said binder.

2. A magnetic recording medium as claimed in claim 1 wherein said polymer has a degree of polymerization of not more than 70.

3. A magnetic recording medium as claimed in claim 2, wherein said polymer has a degree of polymerization of not more than 50.

4. A magnetic recording medium as claimed in claim 1 wherein said polar functional group is selected from the groups consisting of carboxyl, hydroxyl, phenolic-hydroxyl, and sufonic and further wherein said groups are contained in an amount of 1 to 30 mol %.

5. A magnetic recording medium as claimed in claim 4, wherein said polymer is contained in an amount of 0.1 to 10 wt % of the ferromagnetic particles.

6. A magnetic recording medium as claimed in claim 5, wherein said polymer is contained in an amount of 0.3 to 7 wt % of the ferromagnetic particles.

7. A magnetic recording medium as claimed in claim 6, wherein said polymer is contained in an amount of 0.5 to 5 wt % of the ferromagnetic particles.

8. A magnetic recording medium as claimed in claim 1 or 4, wherein said polymer is selected from the group consisting of
   (a) a copolymer with a backbone of acrylic acid ester or methacrylic acid ester and acrylic acid, methacrylic acid, crotonic acid or 2-hydroxymethyl acrylate as a functional moiety thereon,
   (b) a copolymer of vinyl chloride or vinyl acetate and maleic anhydride or vinyl alcohol,
   (c) a copolymer of styrene and a polymerizable unsaturated monomer having polar functional groups,
   (d) polyvinyl phenol,
   (e) polyvinyl alcohol,
   (f) polyvinyl acetal,
   (g) polystyrene sulfonic acid and
   (h) a copolymer of vinylidene chloride and a polymerizable unsaturated monomer having polar functional groups.

9. A magnetic recording medium as claimed in claim 8, wherein said polymer is selected from the group consisting of a butyl acrylate-acrylic acid copolymer, polyvinyl phenol and a lauryl methacrylate-acrylic acid copolymer.

10. A magnetic recording medium as in claim 8, wherein said polymer is selected from the group consisting of a butyl acrylate-acrylic acid copolymer and polyvinyl phenol.

* * * * *